(12) United States Patent
Oana

(10) Patent No.: US 6,843,521 B1
(45) Date of Patent: Jan. 18, 2005

(54) PIVOTING INSTRUMENT PANEL CENTRAL STACK STRUCTURE AND METHOD FOR FLOW-THROUGH INSTRUMENT PANEL CONSOLE INTERFACE

(75) Inventor: Adrian Oana, Windsor (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/789,514

(22) Filed: Feb. 25, 2004

(51) Int. Cl.[7] .............................................. B62D 25/14
(52) U.S. Cl. .......................................... 296/70; 180/90
(58) Field of Search ........................... 296/37.8, 37.12, 296/70, 73, 74; 180/90

(56) References Cited

U.S. PATENT DOCUMENTS

| | | | |
|---|---|---|---|
| 4,317,582 A | * 3/1982 | Cottin et al. ................... | 180/90 |
| 4,400,011 A | * 8/1983 | Matsuno ....................... | 296/70 |
| 4,580,647 A | 4/1986 | Peifer et al. ................... | 180/78 |
| 4,589,639 A | 5/1986 | Peifer et al. ................... | 267/150 |
| 4,682,787 A | 7/1987 | Ruhter et al. ................. | 280/775 |
| 5,064,974 A | 11/1991 | Vigneau et al. ........... | 200/61.62 |
| 5,564,769 A | * 10/1996 | Deneau et al. ................. | 296/72 |
| 5,732,994 A | 3/1998 | Stancu et al. .............. | 296/37.8 |
| 6,474,716 B2 | * 11/2002 | Shikata et al. ................ | 296/70 |
| 6,648,402 B2 | * 11/2003 | Scheib et al. ................. | 296/70 |

* cited by examiner

Primary Examiner—Lori L. Coletta
(74) Attorney, Agent, or Firm—Laura C. Hargitt

(57) ABSTRACT

An adjustable instrument panel for a mass assembled vehicle includes a transverse upper support beam which is generally fixed with respect to the vehicle during assembly. A central stack modular structure is pivotably suspended from the upper support beam and adapted to house one or more vehicle options such as a radio, CD, and air conditioning control. The central stack modular structure is combined with a floor console as a unitary structure which has a lower support brace to adjustably connect the unitary structure with respect to the vehicle floor so that the instrument panel can accommodate floor build variations and obtain flow-through with the floor console in vehicles being mass assembled.

7 Claims, 3 Drawing Sheets

PIVOTING INSTRUMENT PANEL CENTRAL STACK STRUCTURE AND METHOD FOR FLOW-THROUGH INSTRUMENT PANEL CONSOLE INTERFACE

TECHNICAL FIELD

This invention relates to a flow-through instrument panel for a vehicle to accommodate floor build variations in vehicle assembly.

BACKGROUND OF THE INVENTION

In the prior art, engineering faced continuing challenges to achieve design goals when seeking a "flow-through" (i.e., the appearance of uninterrupted connection) between the instrument panel and the floor console. The mass assembly of vehicles necessarily have build variations that complicate this flow-through goal. Attempts to achieve a smooth flow-through between instrument panel and floor console may result in uneven gaps between adjacent fixed portions of the instrument panel and the console. The prior art lacks an improvement which would eliminate overhangs or shingling at these locations so that high quality fits of world class modern look can be achieved. Another need in the prior art is for a reduction in the number of floor console parts in a flow-through instrument panel. Past attempts to achieve such results have been to reduce the build variations of the metal body, but this results in higher costs. Another attempt is to split the console base into several parts so that each of the split parts can match any floor variation with the split seam in a location hidden between the seats where the seats flank the console.

SUMMARY OF THE INVENTION

This invention relates to a vehicle instrument panel with an adjustable flow-through portion to the vehicle console whereby to accommodate the floor build variations which may occur during mass production vehicle assembly. The invention seeks to incorporate a horizontal pivot axis in the instrument panel beam so that the central stack modular structure and floor console are unitary and move or pivot as one in order to accommodate vehicle floor build variations. The pivot is achieved with two brackets attached to and projecting from a fixed portion of a beam which supports the instrument panel. Each bracket carries at its projecting end a large diameter plastic bushing as the pivot axis for the central stack structure and the floor console affixed to the central stack structure. The central stack structure is made out of stamped steel. It can be program specific or have modular mounting features (such as holes or slots) for receiving a radio unit, CD unit, AC (air conditioning) control head and a trim plate. The steel structure for the central stack acts much like a computer (mini tower) and opens up the opportunity for servicing and changing options and/or dialing variations.

Two braces are attached on opposite sides of the central stack allowing for length and pivotal adjustment. The braces also have locating and attaching features on their lower ends for receiving and affixing the front of the floor console base to the central stack. Such an arrangement adapts the unitary stack and console to floor variations so as to maintain the correct relationship for a butt flow-through interface of the stack and console to the vehicle floor. Loose attachments to the braces are tightened after the unitary console base and central stack are pivoted into position with respect to the vehicle floor. After the console is oriented with respect to the floor of the vehicle to accommodate any build variations, the rear end of the console is attached to the floor of the vehicle by a fastener through a bracket on the floor and an accommodating slot on the back end of the console.

A central stack trim plate is affixed to the central stack modular structure for unitary movement therewith. The trim plate has two parallel surfaces on the sides to interface with the glove box door and the driver's side knee bolster. This relationship between the respective trim plate portions and the inboard edges of the glove box and bolster forms slip planes which hide angle variations when the central stack structure pivots, thereby maintaining a constant gap.

Side service access doors are attachable to the unitary central stack structure and floor console. The doors snap-on guided by locating features on the unitary stack and console. This arrangement maintains the slip plane between the unitary stack and console and the inboard edges of the adjacent glove box and the driver side knee bolster.

The brackets provide a low cost program specific structure which brings the pivot axis behind a cross car instrument panel feature line which is part of the design theme. This makes any horizontal gap aesthetically unchangeable and unnoticeable due to pivoting the unitary central stack and floor console to accommodate the variation in floor build.

Another feature combinable with the pivotable unitary central stack structure and floor console is an improved adjustable or horizontally floatable shifter face plate assembly which also accommodates variations between console and vehicle floor due to floor build variations during vehicle assembly. The result is also high quality fits and a world class modern look. The improvement of this feature also eliminates the need for an escutcheon or ring around the shifter face plate to hide any uneven gaps between the shifter face plate assembly and the shifter rod opening in the floor console.

The adjustable shifter face plate assembly is improved by permitting the face plates to float horizontally. This also accommodates the floor build variations. There is an intermediary plate which carries the shifter position marks or indicia (PRNDL) and which is movable sidewise to close any lateral gaps between the shifter plate assembly and the console opening. The intermediary plate also has an anti-rattle feature. The top plate can move longitudinally to close any longitudinal gaps between the shifter plate assembly and the console opening. An eccentric cone is movably positioned on the shifter rod. The cone can be pushed down on the shifter rod shaft after the intermediary plate and the top plate have found their right positions on the console base to cover the shifter rod opening. The eccentricity of the cone is used to accommodate any lateral shift in the parts occasioned by any floor build variations and the float of the intermediary and top plates. The cone can be twisted or rotated on the shifter to achieve the world class look desired between the shifter rod and the shifter face plate assembly.

Accordingly, it is an object of this invention to provide an adjustable instrument panel for a vehicle which has a fixed portion extendable transversely between the sides of the vehicle and a pivotable portion (central stack and floor console) pivotable with respect to the fixed portion and adjustably suspendable between said fixed portion and a floor of the vehicle. The pivotable portion includes an option structure or stack which can receive various options such as a radio, air conditioning control, CD, etc.

It is also an object of this invention to provide a method of adjusting an instrument panel and floor console to accommodate floor build variations in vehicle assembly. The method includes forming the instrument panel into two portions. Then installing option structure and the floor console into one of said portions as a unitary structure movable with respect to the vehicle floor by sufficiently pivoting the one portion with respect to the other portion until the one portion orients itself with respect to the vehicle floor. Such pivoting accommodates any angular variation which exists between the instrument panel and the floor of the vehicle during assembly.

A further object of this invention is to combine an adjustable shifter face plate assembly in an opening of the floor console of the unitary structure to accommodate the variations between instrument panel and the floor of a vehicle being assembled. The assembly includes a shifter rod support which is adapted to be fixed with respect to the floor. It also includes a shifter rod projecting upwardly from the shifter rod support. It includes a top plate horizontally floatable longitudinally with respect to the opening of the console to orient the shifter face plate assembly with respect to the console opening. The assembly includes an intermediary plate between the shifter rod support and the top plate. The intermediary plate is horizontally floatable laterally or transversely with respect to the opening of the console whereby to orient the shifter face plate assembly with respect to the console opening. And finally, an eccentric cone is positionable on the shifter rod and is sufficiently slidably and rotatably moveable with respect to the shifter rod so that any resulting offset of the top plate slot with respect to the shifter rod is accommodated.

The above features and other features and advantages of the present invention are readily apparent from the following detailed description of the best modes for carrying out the invention when taken in connection with the accompanying drawings.

DESCRIPTION OF THE PREFERRED EMBODIMENT

Figure 1:
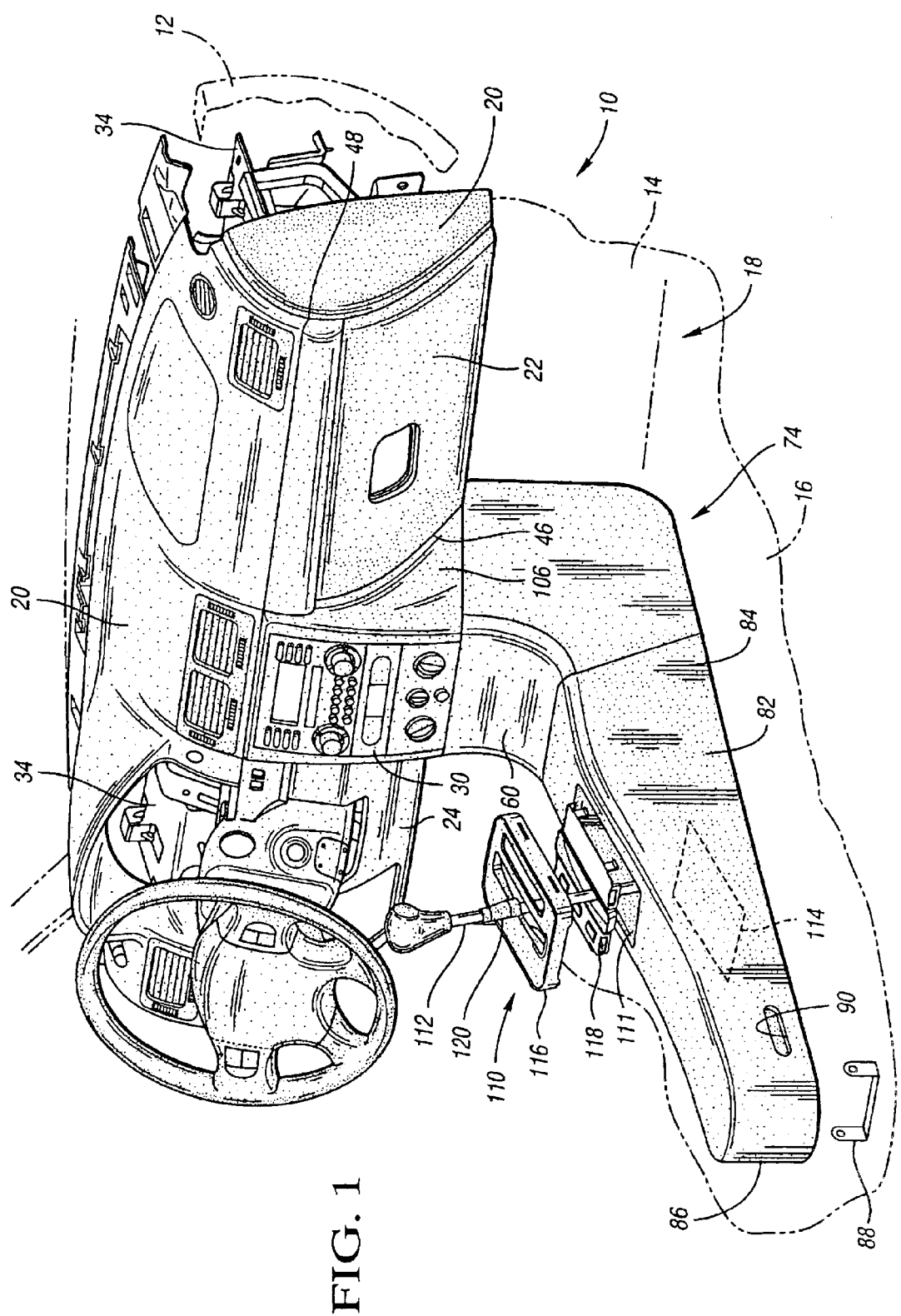
FIG. 1 is a fragmentary perspective view of an adjustable instrument panel and control console in a vehicle.

This is an invention to improve the fit of an instrument panel and console to an automotive vehicle built by mass assembly. With reference to FIG. 1, the vehicle 10 includes a structural frame 12, a front wall 14, and a floor 16. During mass production, the orientation of the frame 12 and the vehicle floor 16 may vary between vehicles being assembled. A passenger compartment 18 in such vehicles is defined by front wall 14 and floor 16. Thus, the location of floor 16 with respect to frame 12 may vary. Across the front of the passenger compartment is a vehicle instrument panel (IP) 20. The instrument panel 20 includes a fixed or stationary glove box panel or door portion 22 and a fixed or stationary driver's side knee bolster panel portion 24. A vehicle option package 30 rests between the glove box panel and the knee bolster.

Figure 2:
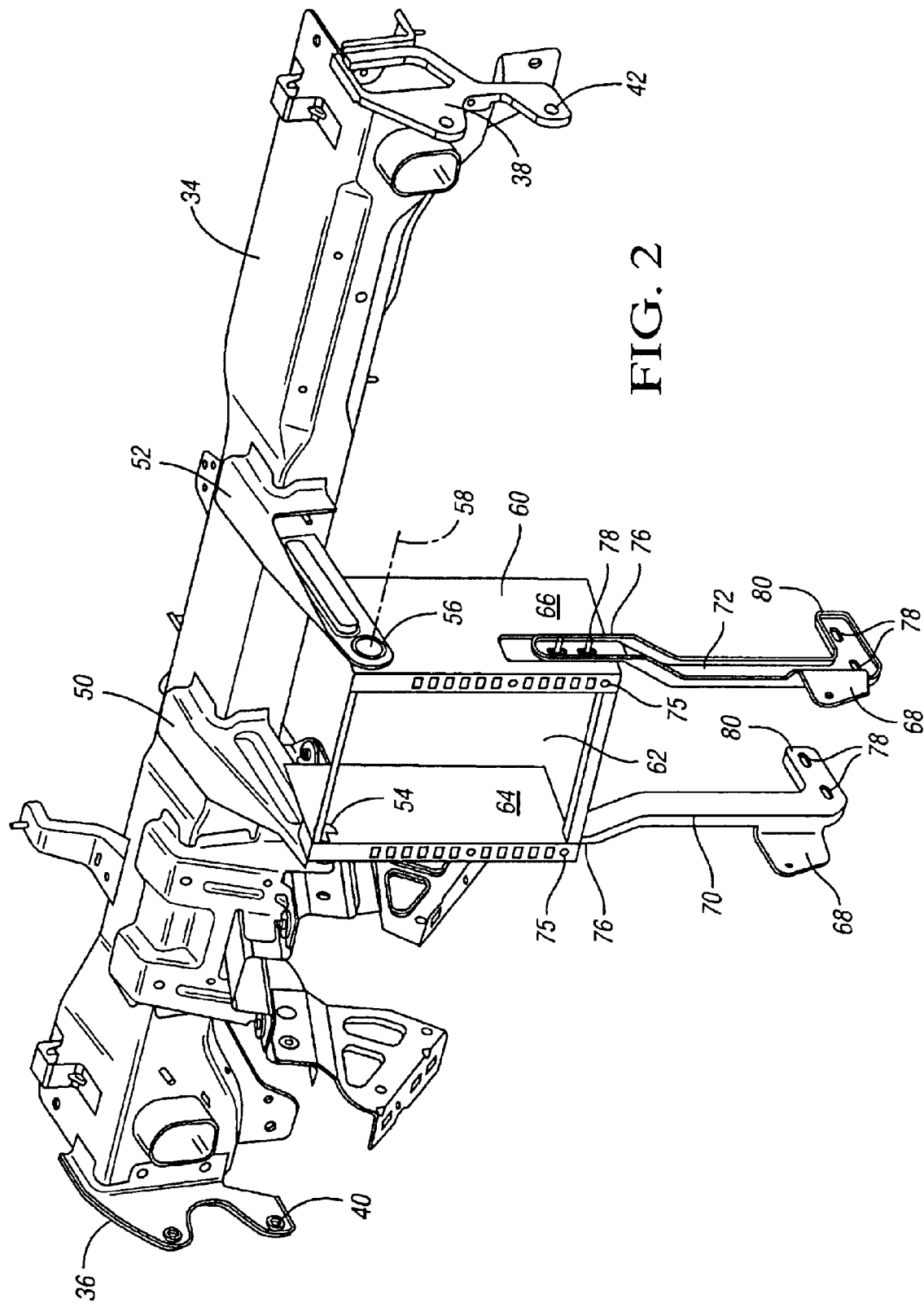
FIG. 2 is a perspective view of a pivotable support structure portion of the instrument panel in FIG. 1.

Turning now to FIG. 2, the instrument panel includes an instrument panel beam 34 having ends 36, 38 which affix to the frame 12 (FIG. 1) on opposite sides of the vehicle. The fixed beam extends transversely across the front of the passenger compartment 18. Brackets or flanges 40, 42 at the respective ends of the instrument panel beam are configured for affixing each end of the beam to the vehicle frame 12.

The instrument panel beam 34 is transverse to the inboard side edge 46 (FIG. 1) of the glove box panel. A similar inboard side edge (concealed) exists along the inboard side of the driver's knee bolster 24. Two brackets 50, 52 project rearwardly in cantilever fashion from the instrument panel beam 34. At the end of each bracket is a large diameter (20–30 mm) plastic bushing, or plastic equivalent bushing 54, 56 which together form a horizontal pivot axis for a central stack modular structure 60 suspended therebelow. The pivot axis should be as close as possible behind a feature line 48 which is part of the design theme shown in FIG. 1. The central stack modular structure is a portion of a pivotable unitary structure 74 which also includes a floor console portion 82. Together portions 60 and 82 horizontally pivot on the instrument panel beam 34 and with respect to the inboard side edges 46 of the glove box panel 22 and the driver's side knee bolster 24.

The central stack modular structure portion 60 defines an option compartment 62 with generally parallel sides or walls 64, 66 which define a space into which one or more of a plurality of options can be placed. Such options may include a radio, CD and/or various air conditioning control knobs. These knobs extend into the passenger compartment from controls which are at least partially contained within the options compartment 62. Depending from the sidewalls of the central stack modular structure is a pair of braces 70, 72. Each brace has an upper end 76 which is adjustably positionable with respect to the central stack modular structure 60. The adjustment is facilitated by slot and screw connections 78 which permit linear movement between the brace and the compartment walls 64, 66. The lower end 80 of each brace is adjustably positionable with respect to the floor 16 of the vehicle. Similar slot and screw connections 78 at a floor bracket are used for this purpose.

The floor console portion 82 of the pivotable unitary structure 74 extends longitudinally along the floor 16 of the vehicle. A forward end 84 of the console is affixed with a screw and slot connection 78 to the lower end 80 of each brace 70, 72 at brackets or flanges 68 and to the central stack modular structure 60 at connector holes 75. Together the central stack modular structure 60 and the floor console 82 stay attached and pivot as a unitary structure 74. Thus the rearward end 86 of the console portion of the unitary structure 74 tilts downwardly as the unitary structure pivots for an accommodating connection to the floor 16 of the vehicle, such as at a floor bracket 88. A slot 90 on the rearward end of the floor console accommodates the various positions of the console at successive floor build variations when the unitary structure 74 pivots with respect to each successive floor build variation.

With the foregoing arrangement, the parallel sides 64, 66 of the central stack modular structure when covered by a trim plate 106 form a slip plane gap with respect to the inboard side edges 46 of the glove box door and the driver's side knee bolster. The gap is sufficient with respect to these inboard side edges of the glove box and the knee bolster so that, after the central stack modular structure portion 60 of the unitary structure 74 has pivoted, the gap between the inboard side edges and the trim plate is sufficiently constant to aesthetically accommodate any floor build variation in vehicles being assembled.

More particularly, the trim plate 106 (FIGS. 1 and 3) fits over the front of the central stack modular structure portion of the unitary structure 74 to aesthetically dress-up the control knobs extending from the options compartment 62 within the central stack modular structure portion 60. Trim plate portions 108 lay between the central stack modular structure and the inboard edges 46 of the glove box 22 and knee bolster 24. These trim plate portions move with the central stack structure alongside the innerside edges of glove box and bolster so that the gap remains the same when the unitary structure 74 pivots.

Side service access doors 100, 102 (FIG. 3) bridge the gap between the forward end 84 of the floor console 82 and a flange 104 on each side of the trim plate 106. The side service access doors include fingers 107 which are snapable in place on the console and trim plate after the unitary structure 74 is pivoted into place to accommodate the floor build variations, and after the screw fasteners 78 are tightened to hold the braces 70, 72.

Figure 3:
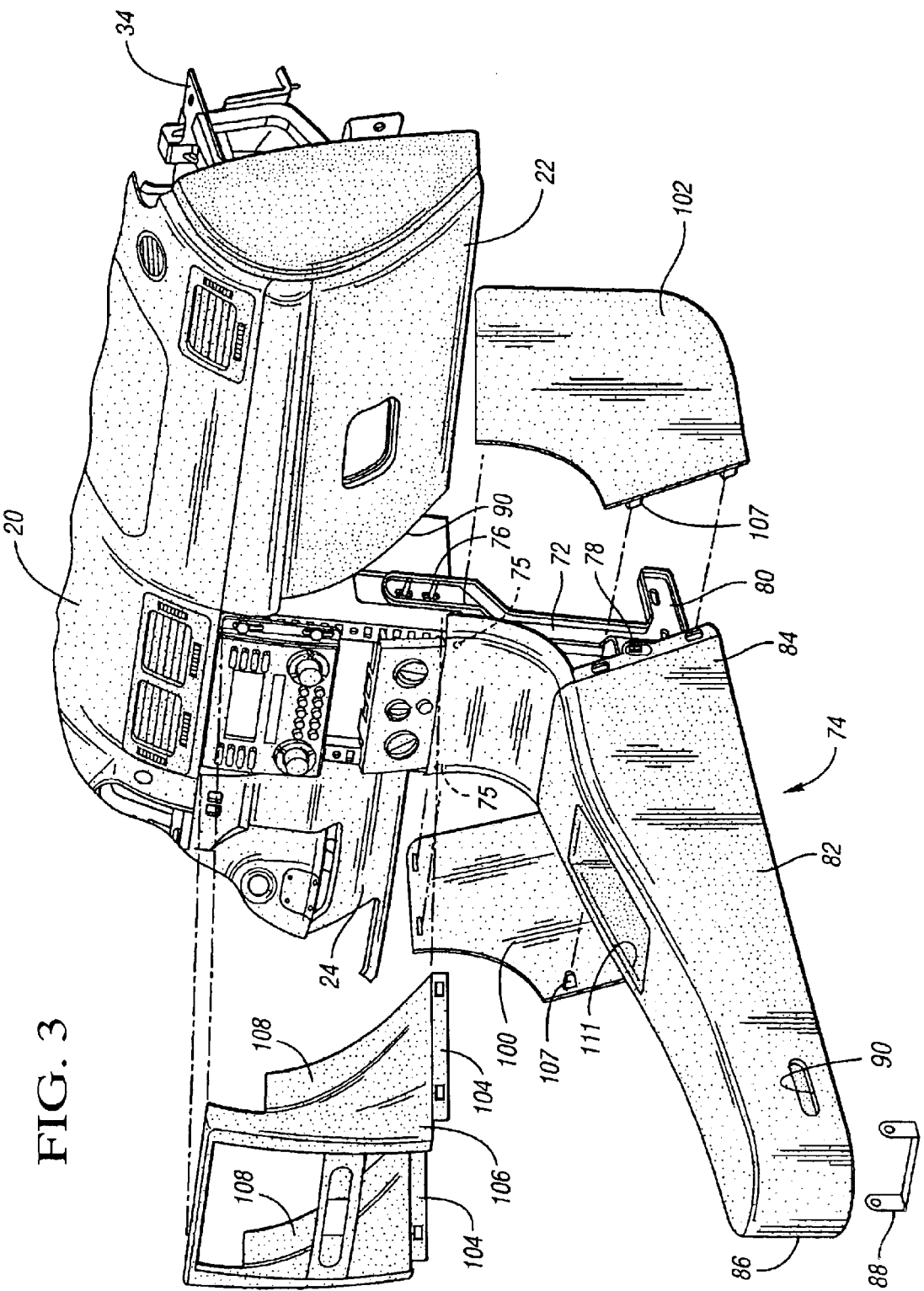
FIG. 3 is an exploded, fragmentary perspective of the control console of FIG. 1 affixed to the pivotable support structure portion of FIG. 2 to form a unitary pivotable portion of the instrument panel.

A unitary structure 74 which can pivot with respect to the instrument panel beam 34 also provides an improved method of adjusting the instrument panel and the floor console of a vehicle so as to accommodate floor build variations in vehicle assembly. The method includes forming the instrument panel into a fixed portion and a pivotable portion. The pivotable portion is unitary and includes as portions thereof the central stack modular structure 60 and a floor console 82. A vehicle option package 30 may then be installed in the central stack portion 60. Next, sufficiently pivoting the unitary pivotable portion 74 with respect to the fixed instrument panel portion 34 until the console portion of the unitary portion 74 is sufficiently oriented with respect to the vehicle floor to accommodate the floor build variations. After the console end 86 finds its position on the vehicle floor, the screw and slot fasteners 78 are tightened to affix the unitary pivotable portion 74 in its adjusted position and the console end 86 is attached to bracket 88. Finally, access doors 102 are snapped in place, as shown in FIG. 3.

Generally speaking, an adjustable instrument panel results from the foregoing method and includes a fixed portion (the beam portion which extends between the sides of the vehicle), a pivotable portion (the central stack modular structure and the floor console) which pivots with respect to the fixed beam portion and is adjustably suspendable between the fixed portion of the beam and the floor 16 of the vehicle and then finally the option structure itself is supported on the pivotable portion and includes option items such as the radio, CD and air conditioning controls.

Where there may be floor build variations, aesthetic orientation of the unitary structure 74 may be complemented by combining an adjustable shifter face plate assembly 110 which is the subject of a concurrently filed application, GP-303889 (GM0450PUS) entitled "Floating PRNDL Face and Method to Accommodate Floor Build Variations" which is incorporated by reference herein in its entirety. Sufficient for the combination with the unitary structure 74 of this invention and with reference to FIG. 1, the adjustable shifter face plate assembly 110 for a shifter rod 112 and its support 114 includes a top plate 116 horizontally floatable longitudinally with respect to the console opening 111 in the floor console 82, an intermediary plate 118 between the shifter rod support and the top plate and horizontally floatable transversely with respect to the shifter rod support 114 and the opening 111 in the floor console while facilitating the longitudinal float of the top plate with respect to the intermediary plate all sufficiently so as to permit the top plate to move sufficiently to accommodate and aesthetically fit within the opening 111. Finally, an eccentric cone 120 is positionable on the shifter rod to align the shifter rod aesthetically with respect to the slot in the top plate through which the shifter rod projects While the best modes for carrying out the invention have been described in detail, those familiar with the art to which this invention relates will recognize various alternative designs and embodiments for practicing the invention within the scope of the appended claims.

What is claimed is:

1. An adjustable instrument panel and floor console arrangement for a vehicle comprising:

a fixed portion of the vehicle;

a pivotable unitary portion having an option stack and floor console pivotable with respect to said fixed portion and adjustably suspendable between said fixed portion and a floor of the vehicle; and an option package supportable on said option stack.

2. The adjustable instrument panel of claim 1, wherein said floor console has a console opening and is adjustably connectable to said vehicle floor when the pivotable unitary portion is adjustably suspended at the floor of the vehicle, and further comprising:

an automatic shifter face plate assembly including a shift rod projecting through the console opening;

an intermediary plate having a slot through which the shifter rod is projectable, said intermediary plate being laterally horizontally floatable to orient said shifter face plate assembly with respect to said console opening;

a top plate having a slot through which the shifter rod is projectable, said top plate being longitudinally horizontally floatable to orient said shifter face plate assembly with respect to said console opening; and an eccentric cone relatively slidably and rotatably supported on the shifter rod to accommodate any offset of the top plate slot relative to the shifter rod after the plates have floated.

3. An adjustable instrument panel for a vehicle to accommodate floor build variations in vehicle assembly comprising:

fixed panel portions spaced from each other and each having an inboard side edge on a vertical longitudinal slip plane;

an instrument panel beam;

two brackets each attached to the instrument panel beam;

a central stack modular structure pivotable on said brackets with respect to the instrument panel beam and the inboard side edges of the fixed panel portions, said central stack modular structure defining a compartment with generally parallel sides and including mounting features including holes and slots for attaching one or more of a plurality of options including at least one of a radio, CD, and air conditioning control at least partially within the compartment, wherein at least one of the plurality of options is pivotable with the central stack modular structure;

a pair of braces depending from respective sides of the central stack modular structure, each brace having an upper end adjustably positionable with respect to the central stack modular structure and a lower end adjustably positionable with respect to the floor of the vehicle; and a floor console having a forward end sufficiently affixable to each brace and said central stack modular structure to form a pivotable unitary structure, and a rearward end of said floor console being connectable to the floor of the vehicle after the unitary structure is pivoted and the forward end of the floor console is affixed;

wherein the central stack modular structure forms a sufficient slip plane gap with respect to the inboard side edges of said fixed panel portions when the central stack modular structure is pivoted so that the gap between each inboard side edge and the central stack modular structure after the unitary structure has pivoted is sufficiently constant to aesthetically accommodate the floor build variations in vehicles being assembled.

4. The adjustable instrument panel of claim 3 including a side service access door on each side of the unitary structure along the respective slip plane gap between said forward end of the floor console base and a respective one of the inboard side edges.

5. The adjustable instrument panel of claim 4 wherein said side service access doors are snappable in place after the unitary structure is pivoted to accommodate said floor build variations and the forward end of the floor console is affixed.

6. The adjustable instrument panel of claim 3 wherein the central stack modular structure includes a trim plate at least partially enclosing at least one of said plurality of options and having a portion at least partially forming such slip plane gap.

7. A method of adjusting an instrument panel and a floor console with respect to a vehicle floor to accommodate floor build variations in vehicle assembly comprising:

forming the instrument panel into two portions;

forming one of said two portions into a unitary structure having an option portion and a floor console portion; and sufficiently pivoting said one portion with respect to the other portion until the one portion is sufficiently oriented with respect to the vehicle floor to accommodate any variations between instrument panel and the floor of the vehicle during assembly.

* * * * *